United States Patent
Marchya et al.

(10) Patent No.: US 10,014,693 B2
(45) Date of Patent: Jul. 3, 2018

(54) SYSTEM AND METHOD FOR REDUCING POWER CONSUMPTION AND IMPROVING PERFORMANCE BASED ON SHARED REGULATOR CURRENT SUPPLY VOLTAGE

(71) Applicant: QUALCOMM Incorporated, San Diego, CA (US)

(72) Inventors: Dileep Marchya, Hyderabad (IN); Dhaval Kanubhai Patel, San Diego, CA (US); Ujwal Patel, Union City, CA (US); Nagamalleswararao Ganji, San Diego, CA (US); Mastan Manoj Kumar Amara Venkata, San Diego, CA (US); Panneer Arumugam, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 15/162,369

(22) Filed: May 23, 2016

(65) Prior Publication Data
US 2017/0338661 A1 Nov. 23, 2017

(51) Int. Cl.
*H02J 3/14* (2006.01)
*H02J 4/00* (2006.01)

(52) U.S. Cl.
CPC .................................. *H02J 4/00* (2013.01)

(58) Field of Classification Search
CPC ...................................................... H02J 4/00
See application file for complete search history.

(56) References Cited

U.S. PATENT DOCUMENTS

| | | | |
|---|---|---|---|
| 7,707,434 B2 | 4/2010 | Kim et al. |
| 7,752,365 B2 | 7/2010 | Taylor et al. |
| 7,844,840 B2 | 11/2010 | McShane et al. |
| 7,932,639 B2 | 4/2011 | Ma et al. |
| 2005/0283630 A1 | 12/2005 | Shikata |
| 2006/0156045 A1 | 7/2006 | Galles |
| 2008/0162770 A1 | 7/2008 | Titiano et al. |
| 2008/0301474 A1 | 12/2008 | Bussa et al. |
| 2009/0158060 A1 | 6/2009 | Vaajala |
| 2009/0249089 A1 | 10/2009 | Tremel et al. |
| 2009/0289615 A1 | 11/2009 | Foley |
| 2011/0055603 A1 | 3/2011 | Wolfe |

(Continued)

OTHER PUBLICATIONS

International Search Report and Written Opinion—PCT/US2017/030434—ISA/EPO—dated Jul. 28, 2017.

*Primary Examiner* — Jared Fureman
*Assistant Examiner* — Duc M Pham
(74) *Attorney, Agent, or Firm* — Loza & Loza, LLP/Qualcomm

(57) ABSTRACT

The disclosure relates to a system including a set of subsystems sharing a voltage rail. The system includes a power controller configured to send messages, such as interrupts, to the subsystems concerning a change of state of a supply voltage on the voltage rail. Such messages may have been sent in response to requests and messages from the subsystems, respectively. In response to the messages, the subsystems may send requests to the power controller for different dynamic clock voltage scaling (DCVS) levels, respectively. In response to such requests, the power controller may set the supply voltage and frequencies of clock signals for the requesting subsystems, respectively.

19 Claims, 9 Drawing Sheets

(56) References Cited

U.S. PATENT DOCUMENTS

| | | | |
|---|---|---|---|
| 2011/0276812 A1* | 11/2011 | Lee | G06F 1/26 |
| | | | 713/300 |
| 2012/0054511 A1 | 3/2012 | Brinks et al. | |
| 2014/0232188 A1* | 8/2014 | Cheriyan | G06F 1/3206 |
| | | | 307/31 |
| 2015/0143143 A1* | 5/2015 | Park | G06F 1/3296 |
| | | | 713/320 |
| 2015/0370296 A1 | 12/2015 | Purcell et al. | |

* cited by examiner

| DCVS LEVEL | CX V-CORNER | FREQ-CORNER |
|---|---|---|
| -5 | V5 | f5 |
| -4 | V4 | f4 |
| -3 | V3 | f3 |
| -2 | V2 | f2 |
| -1 | V1 | f1 |

Where V5>V4>V3>V2>V1

And f5>f4>f3>f2>f1

| DCVS LEVEL | CX V-CORNER | FREQ-CORNER |
|---|---|---|
| -5 | 1.9V | 500MHz |
| -4 | 1.7V | 400MHz |
| -3 | 1.5V | 300MHz |
| -2 | 1.3V | 200MHz |
| -1 | 1.1V | 100MHz |

SYSTEM AND METHOD FOR REDUCING POWER CONSUMPTION AND IMPROVING PERFORMANCE BASED ON SHARED REGULATOR CURRENT SUPPLY VOLTAGE

BACKGROUND

Field

Aspects of the present disclosure relate generally to systems including a set of subsystems sharing a voltage rail, and in particular, to a system and method for reducing power consumption and improving performance based on messages to subsystems regarding the current state of a supply voltage on the voltage rail.

Background

Some systems include a set of subsystems sharing a voltage rail. That is, each of the subsystems receives the same supply voltage from the shared voltage rail. Often, such systems include a set of clock sources for supplying clock signals for the set of subsystems, respectively. The power supplied to each of the subsystems is a function of the supply voltage and the frequency of the corresponding clock signal.

A subsystem may request a particular supply voltage and clock frequency depending on the specific operation performed by the subsystem. Such supply voltage and clock frequency is often referred to as a voltage-frequency corner, a dynamic clock voltage scaling (DCVS) level, or a dynamic voltage and frequency scaling (DVFS) level. Often, there is a set of available DCVS levels (e.g., V1-f1, V2-f2, V3-f3, V4-f4, and V5-f5, where V1-V5 are available supply voltages and f1-f5 are available clock frequencies, and where V1 <V2 <V3 <V4 <V5 and f1 <f2 <f3 <f4 <f5).

If one of the subsystems is performing a demanding operation, the subsystem may request a DCVS level that provides a relatively large amount of power to the subsystem, such DCVS level V5-f5 or V4-f4. On the other hand, if the subsystem is performing a less demanding operation, the subsystem may request a DCVS level that provides a relatively small amount of power to the subsystem, such DCVS level V1-f1 or V2-f2.

As discussed above, in a system having a set of subsystems sharing the same voltage rail, conflicts are created due to the supply voltage being at a DCVL level suitable for one of the subsystem based on its requirement, but not as suitable for at least another of the subsystems. Accordingly, disclosed herein are techniques that address such conflicts.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to a system including a voltage rail; a voltage regulator configured to generate a supply voltage on the voltage rail; a first subsystem configured to receive the supply voltage from the voltage rail; a second subsystem configured to receive the supply voltage from the voltage rail; and a controller configured to send a first message to at least the first subsystem or the second subsystem in response to a change in a status of the supply voltage.

Another aspect of the disclosure relates to a method including generating a supply voltage on a voltage rail; providing the supply voltage to a first subsystem; providing the supply voltage to a second subsystem; and sending a message to at least the first subsystem or the second subsystem in response to a change in a status of the supply voltage.

Another aspect of the disclosure relates to a system including means for generating a supply voltage on a voltage rail; means for providing the supply voltage to a first subsystem; means for providing the supply voltage to a second subsystem; and means for sending a message to at least the first subsystem or the second subsystem in response to a change in a status of the supply voltage.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A subsystem typically determines its current power requirement based on its current performance requirement. The power requirement may entail a certain voltage corner (supply voltage for the subsystem) and a certain clock frequency corner (frequency of the clock signal supplied to the subsystem). Such voltage-frequency corner is often referred to as a dynamic clock voltage scaling (DCVS) level or dynamic voltage and frequency scaling (DVFS) level (which will be referred to hereinafter as DCVS level). Usually, there is a set of available DCVS levels for a certain subsystem.

Figures 1A, 1B, 2:
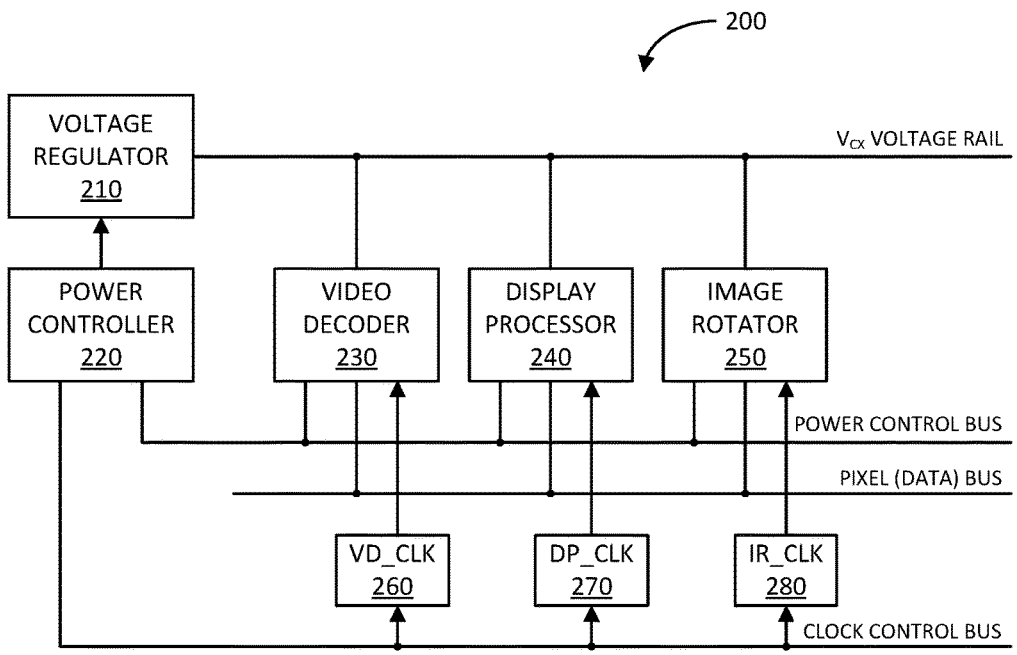
FIG. 1A illustrates a table of an exemplary set of (general) dynamic clock voltage scaling (DCVS) levels in accordance with another aspect of the disclosure.
FIG. 1B illustrates a table of an exemplary set of (specific) dynamic clock voltage scaling (DCVS) levels in accordance with another aspect of the disclosure.
FIG. 2 illustrates a block diagram of an exemplary multimedia system in accordance with another aspect of the disclosure.

FIG. 1A illustrates a table of an exemplary set of (general) dynamic clock voltage scaling (DCVS) levels in accordance with another aspect of the disclosure. In this example, the set includes five (5) available DCVS levels with voltage-frequency corners: V1-f1, V2-f2, V3-f3, V4-f4, and V5-f5. In this example, the voltage corners V1, V2, V3, V4, and V5 are in ascending order (e.g., V1 <V2 <V3 <V4 <V5) and the frequency corners f1, f2, f3, f4, and f5 are also in ascending order (e.g., f1 <f2 <f3 <f4 <f5). The power P supplied to a subsystem may be approximately given by the following equation:

$$P=V^2*f*C$$

Where V is the particular voltage corner (e.g., V1, V2, V3, V4, or V5) supplied to the subsystem, f is the particular frequency corner (e.g., f1, f2, f3, f4, or f5) of the clock signal supplied to the subsystem, and C is the effective capacitance of the subsystem.

As the equation indicates, the first or lowest DCVS-1 level results in the lowest power supplied to the subsystem. The last or highest DCVS-5 level results in the highest power supplied to the subsystem. Accordingly, in this example, the DCVS-1 to DCVS-5 levels are listed in ascending order of power delivered to a subsystem. A specific example of such DCVS levels is provided in the table depicted in FIG. 2B. For instance, the set of available DCVS-1 to DCVS-5 levels may include the following voltage-frequency corners: 1.1V-100 MHz, 1.3V-200 MHz, 1.5V-300 MHz, 1.7V-400 MHz, and 1.9V-500 MHz, respectively.

A subsystem may request a DCVS level that depends on the activity or operation it is or will be performing. For example, if a subsystem is performing a relatively slow operation (e.g., not a time critical application, such as writing small amount of data into a configuration register), the subsystem may request a low DCVS level, such as DCVS-1 or DVCS-2 level. On the other hand, if the subsystem is performing a relatively fast operation (e.g., a time critical application, such as real-time image processing), the subsystem may request a high DCVS level, such as DCVS-5 or DVCS-4 level.

As a more specific example, a particular subsystem may be an image rotator of a multimedia system. If the image rotator has a current requirement of performing an image rotation (e.g., 90 degree rotation for landscape view) of a 4K @ 60 fps video data, the current power requirement in terms of the clock frequency corner needed to perform this operation may be given by the following expressions:

Minimum clock frequency=(3840×2160×60)/4=125 MHz

Clock frequency corner=round_rate(125 MHz)=200 MHz

Where 3840 is the number of pixels per horizontal line of the rendered frame, 2160 is the number of horizontal lines in the rendered frame, 60 is the number of rendered frames per second, and four (4) is the number of pixels rotated per clock cycle.

As shown, the image rotator requires a minimum clock frequency of 125 MHz to perform the required rotation. However, 125 MHz is not a frequency corner in the available set of DCVS levels. Accordingly, the image rotator will request the next highest (round_rate) available clock frequency corner, which is 200 MHz. Thus, the image rotator will requests DCVS-2 level (See FIG. 1B) having a voltage corner of 1.3V and a clock frequency corner of 200 MHz.

A power controller receives the DCVS-2 level request from the image rotator, and the power controller provides a command to a voltage regulator to generate a supply voltage $V_{CX}$ corresponding to the selected voltage corner (e.g., 1.3V) for the image rotator, and another command to a clock source to generate a clock signal with a frequency corresponding to the selected frequency corner (e.g., 200 MHz) for the image rotator.

Subsequently, in this example, another subsystem, such as a video decoder, that shares the same voltage rail as the image rotator, determines that it needs a DCVS level higher than the DCVS-2 level requested by the image rotator. For example, the video decoder, based on its current performance requirement, sends a request to the power controller for the DCVS-4 level having a voltage-frequency corner of 1.7V-400 MHz. In response, the power controller sends a command to the voltage regulator to generate the supply voltage $V_{CX}$ at the selected voltage corner (e.g., 1.7V) on the voltage rail and another command to a clock source to generate a clock signal with a frequency corresponding to the selected frequency corner (e.g., 400 MHz) for the video decoder.

As the image rotator shares the voltage rail with the video decoder, the image rotator now receives the new supply voltage $V_{CX}$ at 1.7V, although its clock frequency is still at the lower frequency corner of 200 MHz. As a result, the image rotator is not taking advantage of the higher supply voltage $V_{CX}$, which results in slower-than-optimal performance (e.g., it is operating at 200 MHz when it could be operating at 400 MHz) and higher power consumption (e.g., because it could perform the rotation operation in half-the-time with the clock frequency at 400 MHz as compared to 200 MHz).

In summary, the disclosure relates to a technique of providing information to subsystems sharing a voltage rail regarding the current state of the supply voltage $V_{CX}$ on the shared voltage rail so that the subsystems may request additional resources, such as higher clock frequencies, in response to the current state of the supply voltage $V_{CX}$.

Taking the example provided above, when the video decoder requests the higher DCVS-4 level with a voltage-frequency corner 1.7V-400 MHz and the power controller sets the supply voltage $V_{CX}$ to 1.7V, the power controller sends a message (e.g., an interrupt service routine (ISR)) indicating the current state of the supply voltage $V_{CX}$ (e.g., $V_{CX}$ is at 1.7V) to at least one other subsystem, such as the image rotator. Accordingly, the image rotator may now send a request to the power controller for the higher DCVS-4 level having a clock frequency corner of 400 MHz, and when set by the power controller, the image rotator will be able to operate faster and in a more power efficient manner. This is explained below in more detail with reference to several exemplary implementations.

FIG. 2 illustrates a block diagram of an exemplary multimedia system 200 in accordance with another aspect of the disclosure. The multimedia system 200 includes several subsystems, such as a video decoder 230, a display processor 240, and an image rotator 250, all of which share or receive the same supply voltage $V_{CX}$ from a voltage rail.

The multimedia system 200 further includes a power controller 220 communicatively coupled to the video decoder 230, display processor 240, and image rotator 250 via a power control bus. The multimedia system 200 further includes a voltage regulator 210 for generating the supply voltage $V_{CX}$ on the voltage rail based on a command received from the power controller 220.

The multimedia system 200 also includes a video decoder clock source (VD_CLK) 260, a display processor clock source (DP_CLK) 270, and an image rotator clock source (IR_CLK) 280. The VD_CLK clock source 260 generates a clock signal with a particular frequency for the video decoder 230 based on a command from the power controller 220. Similarly, the DP_CLK clock source 270 generates a clock signal with a particular frequency for the display processor 240 based on a command from the power controller 220. In a like manner, the IR_CLK clock source 280 generates a clock signal with a particular frequency for the image rotator 250 based on a command from the power controller 220. The power controller 220 sends commands to the clock sources 260, 270, and 280 via a clock control bus.

The multimedia system 200 further includes a pixel (data) bus for transmitting pixel data between the video decoder 230, display processor 240, and the image rotator 250. As an example, the video decoder 230 (e.g., which has codec functionality) may decode a video file to generate video pixel data. If landscape rotation of the video frame is required, the video pixel data is sent from the video decoder 230 to the image rotator 250 via the pixel (data) bus for performing the required rotation. The rotated video pixel data is then sent from the image rotator 250 to the display processor 240 via the pixel (data) bus for rendering the video on a display (not shown).

The following provides a detailed explanation of techniques of informing (via messages) subsystems sharing a voltage rail of the current state of the supply voltage $V_{CX}$ on the voltage rail, and responding to requests for additional resources (e.g., clock frequency changes) based on the information.

Figure 3:
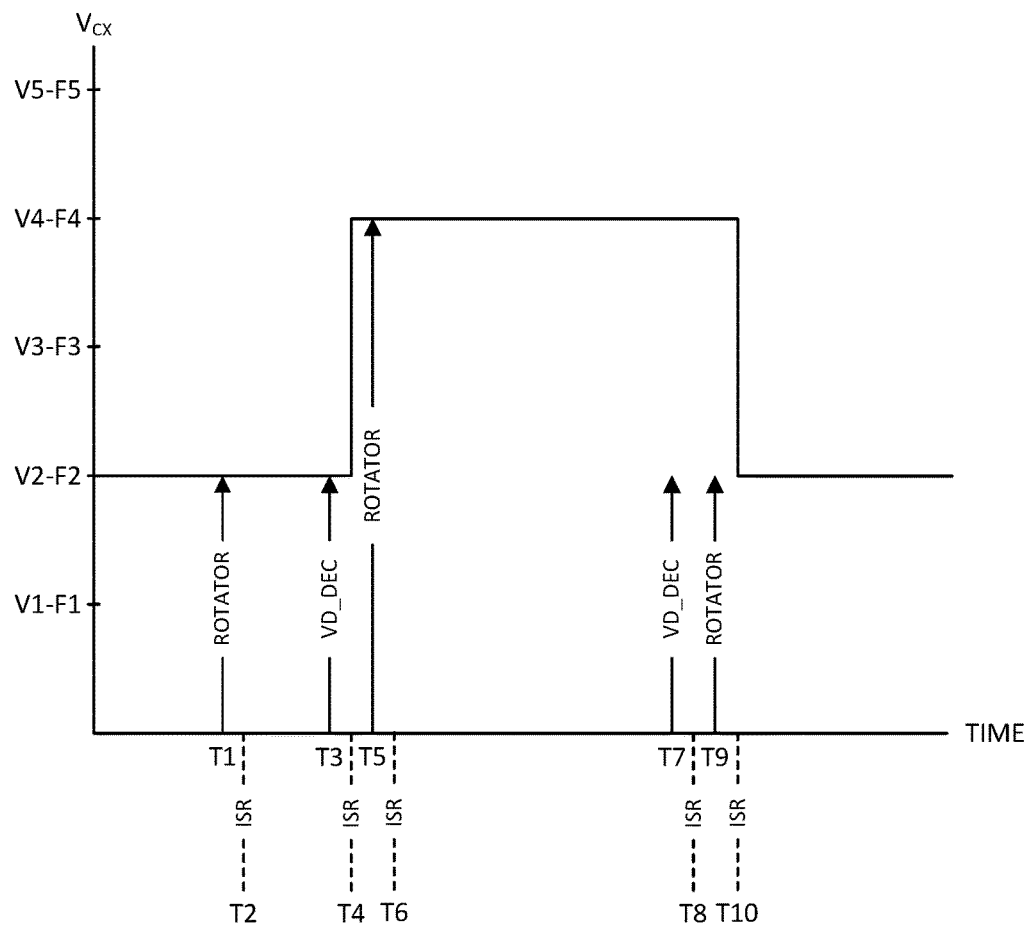
FIG. 3 illustrates a graph of an exemplary supply voltage $V_{CX}$ (y-axis) over time (x-axis) in response to requests for different dynamic clock voltage scaling (DCVS) levels in accordance with another aspect of the disclosure.

FIG. 3 illustrates a graph of the supply voltage $V_{CX}$ (y- or vertical-axis) over time (x- or horizontal-axis) in response to requests for different DCVS levels from the image rotator 250 and the video decoder 230 in accordance with another aspect of the disclosure.

At time T1, the image rotator 250, based on its performance requirement, sends a request to the power controller 220 via the power control bus for the DCVS-2 level corresponding to the V2-f2 voltage-frequency corner. In response to the request, the power controller 220 sends a command to the voltage regulator 210 to set the supply voltage $V_{CX}$ to V2 and a command to the IR_CLK clock source 280 to generate a clock signal with a frequency f2. At time T2, the power controller 220 sends a message (e.g., ISR) to the video decoder 230, display processor 240, and image rotator 250 via the power control bus, the message indicating the current supply voltage $V_{CX}$ is at V2.

At time T3, the video decoder (VD_DEC) 230, based on its performance requirement, sends a request to the power controller 220 via the power control bus for the DCVS-4 level corresponding to the V4-f4 voltage-frequency corner. In response to the request, the power controller 220 sends a command to the voltage regulator 210 to set the supply voltage $V_{CX}$ to V4 and a command to the VD_CLK clock source 260 to generate a clock signal with a frequency f4. At time T4, the power controller 220 sends a message (e.g., ISR) to the video decoder 230, display processor 240, and image rotator 250 via the power control bus, the message indicating the current rail voltage $V_{CX}$ is at V4.

In response to the message indicating that the supply voltage $V_{CX}$ is at V4, at time T5, the image rotator 250 sends a request to the power controller 220 via the power control bus for the DCVS-4 level with the associated V4-f4 voltage-frequency corner. In response to the request, the power controller 220 sends a command to the IR_CLK clock source 280 to generate a clock signal with a frequency f4. At this point, the image rotator 250 is able to operate at a higher performance level and in a more power efficient manner, because it is able to perform the image rotation faster and in half-the-time with the higher clock frequency f4 as compared to the lower clock frequency f2.

At time T6, the power controller 220 may send a message (e.g., ISR) to the video decoder 230, display processor 240, and image rotator 250 via the power control bus, the message indicating the current rail voltage $V_{CX}$ is at V4.

At time T7, the video decoder 230 sends a message to the power controller 220, via the power control bus, indicating a release of the request for the DCVS-4 level. In response, at time T8, the power controller 120 sends a message (e.g., ISR) to the video decoder 230, display processor 240, and image rotator 250 via the power control bus, the message indicating the release of the request for the current supply voltage $V_{CX}$ at V4.

At time T9, the image rotator 250 sends a request to the power controller 220 via the power control bus for the DCVS-2 level corresponding to the V2-f2 voltage-frequency corner. In response to the request, the power controller 220 sends a command to the voltage regulator 210 to set the supply voltage $V_{CX}$ to V2 and a command to the IR_CLK clock source 280 to generate a clock with a frequency f2. As the video decoder 230 has released the request for the DCVS-4 level, the power controller 220 may also send a command to the VD_CLK clock source 260 to lower the frequency of its clock signal to f2. At time T10, the power controller 120 sends a message (e.g., interrupts (ISR)) to the video decoder 230, display processor 240, and image rotator 250 via the power control bus, the message indicating the current rail voltage $V_{CX}$ is at V2.

Figure 4A:
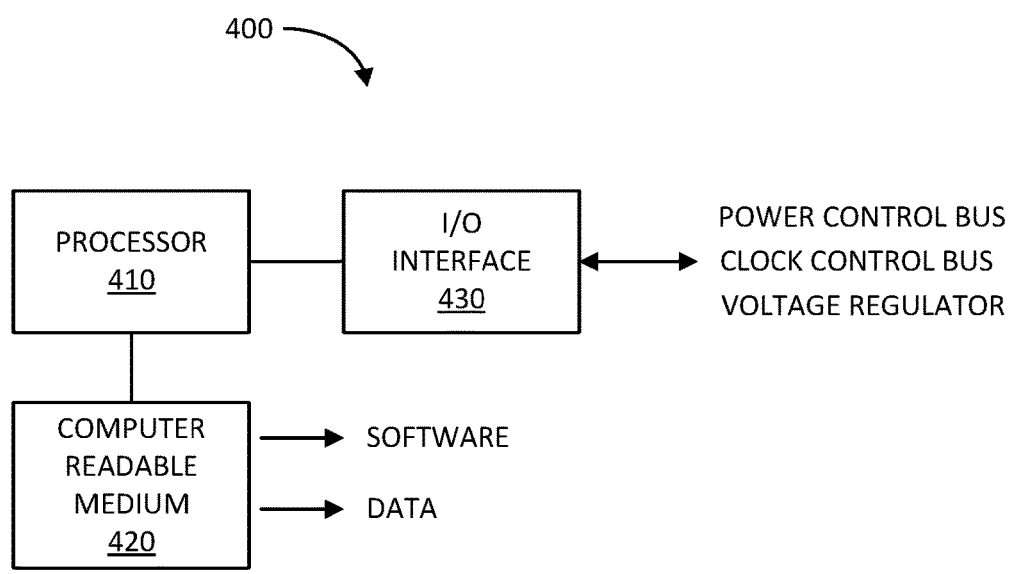
FIG. 4A illustrates a block diagram of an exemplary power controller in accordance with another aspect of the disclosure.

FIG. 4A illustrates a block diagram of an exemplary power controller 400 in accordance with another aspect of the disclosure. The power controller 400 may be an exemplary detailed implementation of power controller 410 previously discussed. As illustrated, the power controller 400 may be processor based.

In particular, the power controller 400 includes a processor 410, a computer readable medium 420, and an input/output (I/O) interface 430. As discussed in more detail below, the processor 410 is configured to perform the various operations of the power controller 400. Examples of the processor 410 may include a microprocessor, microcontroller, reduced instruction set computer (RISC) processor, and others.

The computer readable medium 420 may be any type of data storage medium, such as non-volatile memory, volatile memory, or any combination thereof. The computer readable medium 420 may store one or more software modules, which are read and executed by the processor 410 for performing the various operations of the power controller 400. The computer readable medium 420 may also store data, such as the current-state of the supply voltage $V_{CX}$, the current DCVS level for each of the subsystems, such as the video decoder 230, display processor 240, and image rotator 250, and queued or pending request(s) and/or message(s) pertaining to certain DCVS level(s) from such subsystem(s).

The I/O interface 430 is configured to interface the processor 410 to the power control bus, the clock control bus, and to the voltage regulator 210. More specifically, the I/O interface 430 serves to provide the processor 410 requests and releases for DCVS levels received from subsystems via the power control bus, and provide messages (e.g., ISRs) from the processor 410 to the subsystems via the power control bus. Additionally, the I/O interface 430 serves to provide control commands from the processor 410 to the clock sources 260, 270, and 280 via the clock control bus. Further, the I/O interface 430 serves to provide control commands from the processor 410 to the voltage regulator 210.

Figure 4B:
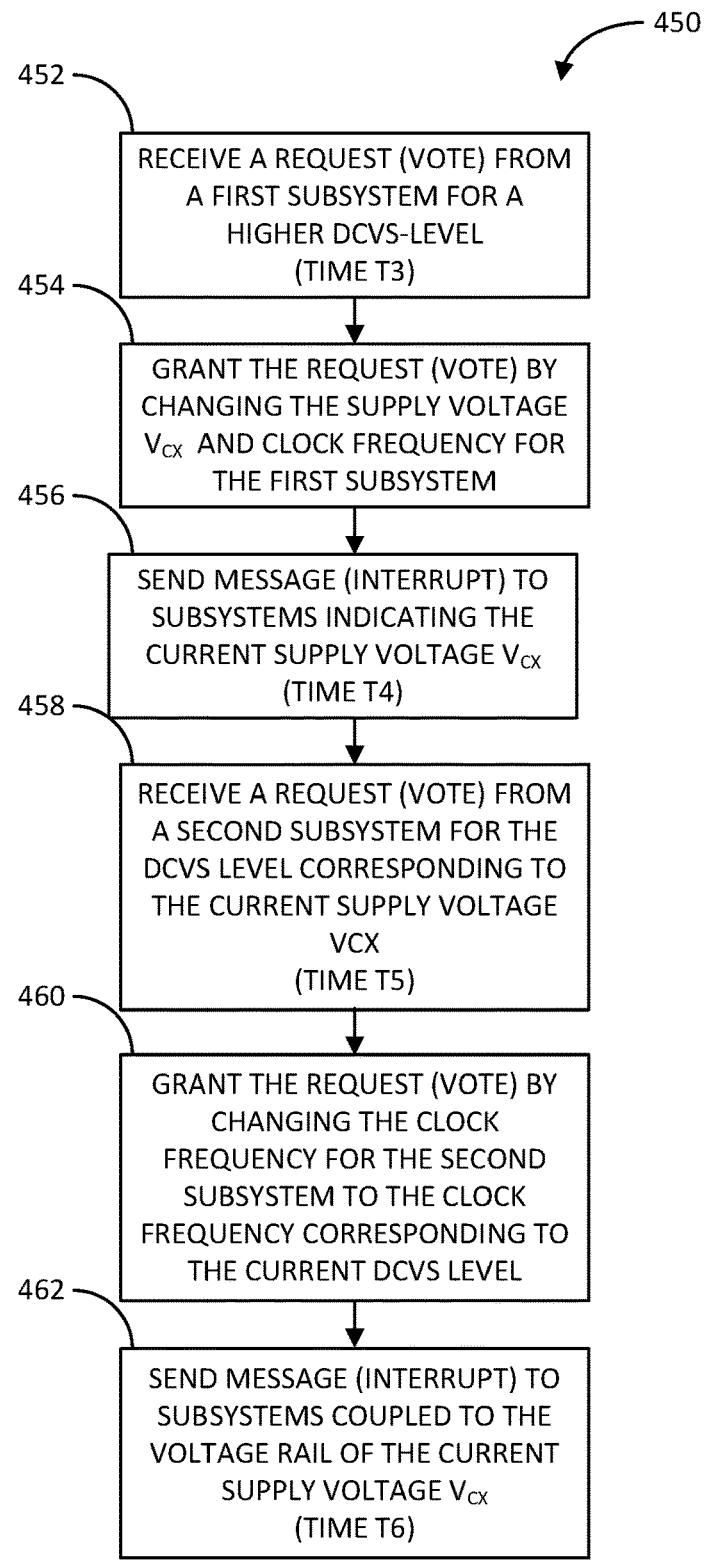
FIG. 4B illustrates a flow diagram of an exemplary method of managing power in accordance with another aspect of the disclosure.

FIG. 4B illustrates a flow diagram of an exemplary method 450 of managing power performed by the power controller 400 in accordance with another aspect of the disclosure. According to the method 450, the processor 410 receives a request (sometimes referred to as a vote) from a first subsystem for a higher DCVS level (block 452). As discussed, the processor 410 may receive such request via the power control bus and the I/O interface 430. Considering the previous example of FIG. 3, the request received via block 452 may be the request sent by the video decoder 230 for DCVS-4 level at time T3.

The method 450 further includes the processor 410 granting the request (vote) by: (1) sending a command to the voltage regulator 210 via the I/O interface 230 to cause the voltage regulator to change the supply voltage $V_{CX}$ in accordance with the requested DCVS level; and (2) sending a command to the corresponding clock source via the I/O interface 230 and the clock control bus to cause the clock source to change the clock frequency f in accordance with the requested DCVS level (block 454). Considering again the previous example of FIG. 3, this is illustrated by the rail voltage $V_{CX}$ being raised from V2 to V4 at approximately time T4.

Additionally, according to the method 450, the processor 410 sends a message (e.g., ISR) to the subsystems via the I/O interface 230 and the power control bus, wherein the message indicates the current state of the supply voltage $V_{CX}$ (block 456). Considering again the example of FIG. 3, such message is sent at time T4.

The method 450 further includes the processor 410 receiving a request (vote) for the DCVS level corresponding to the current supply voltage $V_{CX}$ from a second subsystem via the power control bus and the I/O interface 430 (block 458). Considering the example of FIG. 3, such request is received at time T5.

Then, according to the method 450, the processor 410 grants the request (vote) by sending a command to the corresponding clock source via the I/O interface 230 and the clock control bus to cause the clock source to change the clock frequency f in accordance with the requested DCVS level (block 460).

Then the method 450 includes the processor 410 sending a message (e.g., ISR) to the subsystems via the I/O interface 230 and the power control bus, wherein the message again indicates the current state of the supply voltage $V_{CX}$ (block 462). Considering again the example of FIG. 3, such message is sent at time T6.

Figure 4C:
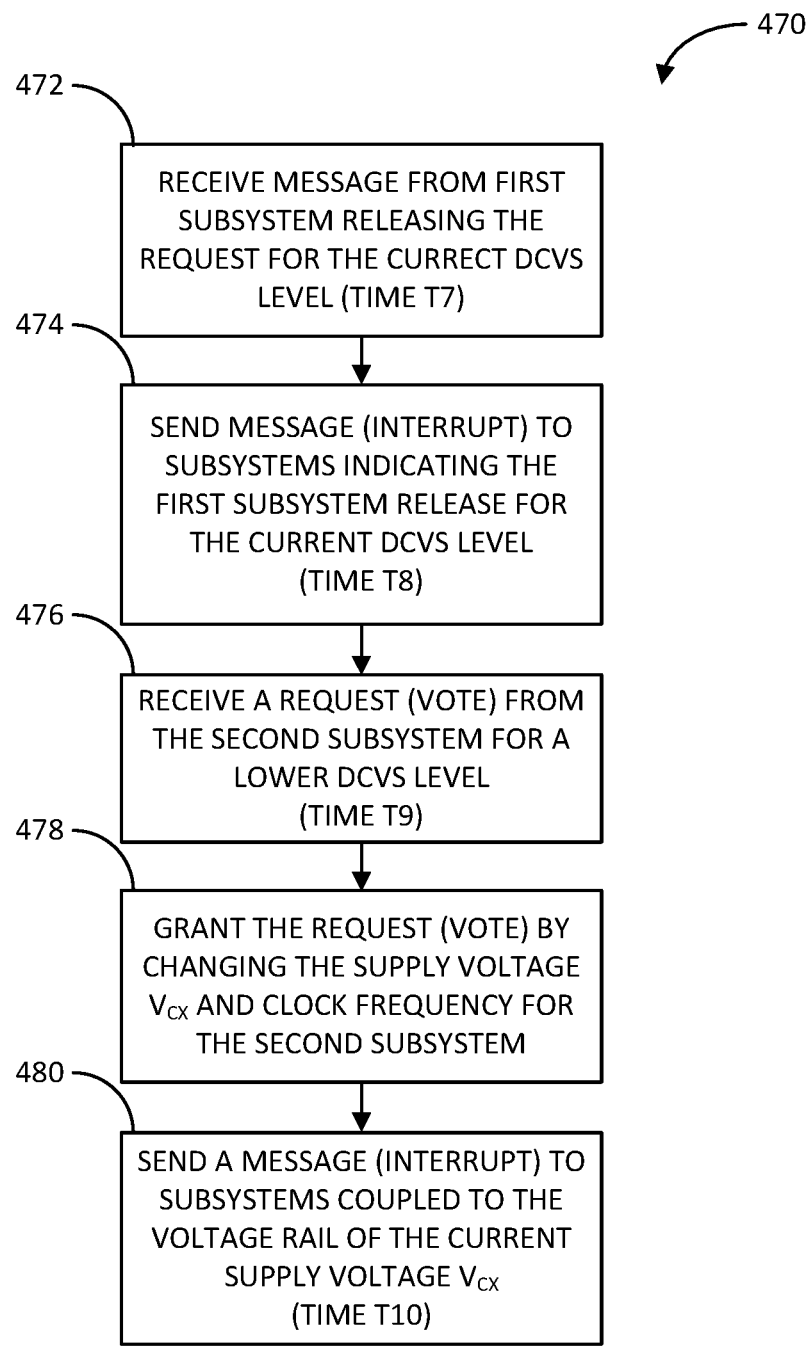
FIG. 4C illustrates a flow diagram of another exemplary method of managing power in accordance with another aspect of the disclosure.

FIG. 4C illustrates a flow diagram of another exemplary method 470 of managing power performed by the power controller 400 in accordance with another aspect of the disclosure. According to the method 470, the processor 410 receives a message from a first subsystem indicating a release a previous granted request for the current DCVS level (block 472). As discussed, the processor 410 may receive such message via the power control bus and the I/O interface 430. Considering the example of FIG. 3, such message is sent by the video decoder 230 at time T7 for releasing the request for the DCVS-4 level.

The method 470 further includes the processor 410 sending a message (e.g., ISR) to the subsystems via the I/O interface 230 and power control bus, wherein the message indicates the release of the request for the current DCVS level (block 454). Considering the example of FIG. 3, this is illustrated by the ISR sent by the power controller at time T8.

Additionally, according to the method 470, the processor 410 receives a request from a second subsystem via the power control bus and the I/O interface 430, wherein the request is for a lower DCVS level (block 476). Considering the example of FIG. 3, the request is received from the image rotator 250 at time T9.

Then, according to the method 470, the processor 410 grants the request (vote) by: (1) sending a command to the voltage regulator 210 via the I/O interface 230 to cause the voltage regulator to change the supply voltage $V_{CX}$ in accordance with the requested DCVS level; and (2) sending a command to the corresponding clock source via the I/O interface 230 and the clock control bus to cause the clock source to change the clock frequency f in accordance with the requested DCVS level (block 478). Considering the example of FIG. 3, this is illustrated by the supply voltage $V_{CX}$ being lower from V4 to V2 at approximately time T10.

Then the method 470 includes the processor 410 sending a message (e.g., ISR) to the subsystems via the I/O interface 230 and the power control bus, wherein the message again indicates the current state of the supply voltage $V_{CX}$ (block 480). Considering again the previous example of FIG. 3, such message is sent at time T10.

Figure 5A:
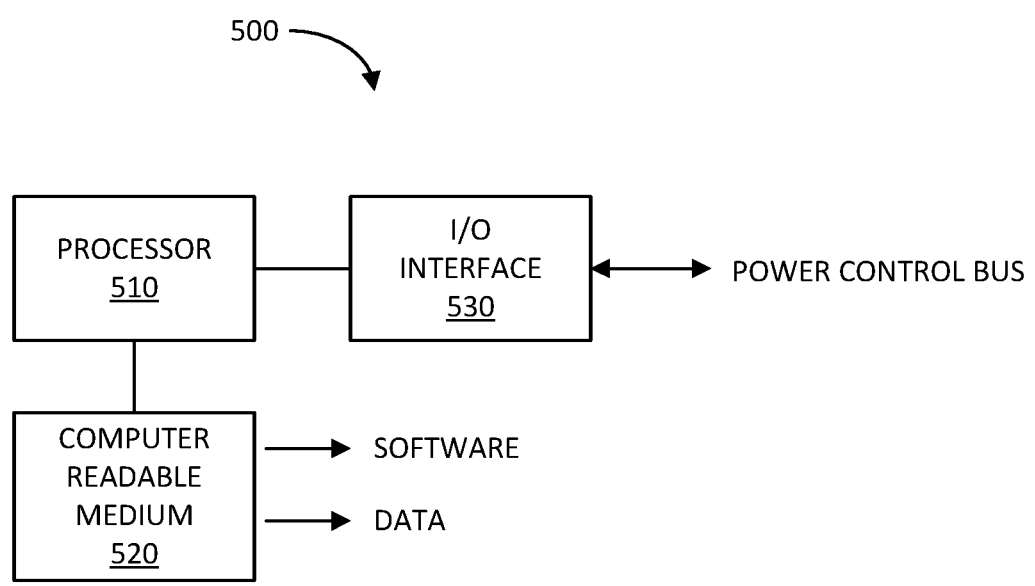
FIG. 5A illustrates a block diagram of an exemplary subsystem in accordance with another aspect of the disclosure.

FIG. 5A illustrates a block diagram of an exemplary subsystem 500 in accordance with another aspect of the disclosure. The subsystem 500 may be an exemplary detailed implementation of any of the subsystems discussed herein, such as the video decoder 230, display processor 240, and image rotator 250. As illustrated, the subsystem 500 may be processor based.

In particular, the subsystem 500 includes a processor 510, a computer readable medium 520, and an input/output (I/O) interface 530. As discussed in more detail below, the processor 510 is configured to perform the various operations of the subsystem 500. Examples of the processor 510 include a microprocessor, microcontroller, reduced instruction set computer (RISC) processor, and others.

The computer readable medium 520 may be any type of data storage medium, such as non-volatile memory, volatile memory, or any combination thereof. The computer readable medium 520 may store one or more software modules, which are read and executed by the processor 510 for performing the various operations of the subsystem 500. The computer readable medium 520 may also store data, such as the current-state of the supply voltage $V_{CX}$ and the current frequency of the clock signal being supplied to the subsystem.

The I/O interface 530 is configured to interface the processor 510 to the power control bus. More specifically, the I/O interface 530 serves to provide requests or releases pertaining to different DCVS levels from the processor 510 to a power controller via the power control bus. Additionally, the I/O interface 530 serves to provide the processor 510 messages indicating the current state of the supply voltage $V_{CX}$ from the power controller via the power control bus.

Figure 5B:
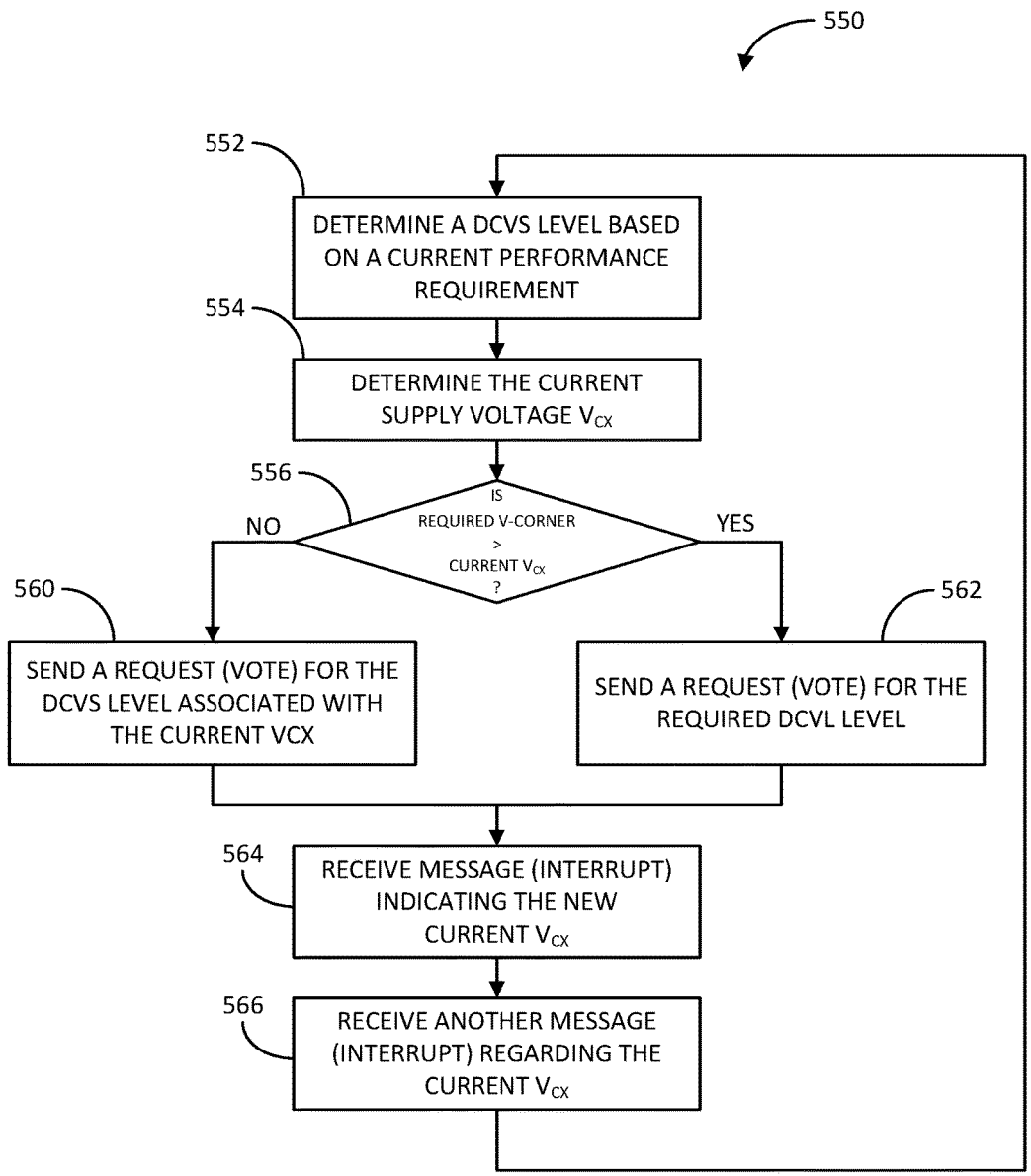
FIG. 5B illustrates a flow diagram of another exemplary method of managing power in accordance with another aspect of the disclosure.

FIG. 5B illustrates a flow diagram of an method 550 of managing received power performed by the subsystem 500 in accordance with another aspect of the disclosure. According to the method 550, the processor 510 determines a DCVS level based on a current performance requirement (block 552). For example, as discussed with reference to FIG. 3, at time T3, the video decoder 230 determines that it requires DCVS-4 level corresponding to voltage-frequency corner V4-f4 based on its current performance requirement.

Further, according to the method 550, the processor 510 determines the current rail voltage $V_{CX}$ (block 554). For example, as discussed with reference to FIG. 3, at time T3, the video decoder 230 determines that the current supply voltage $V_{CX}$ is at V2. Again, this is done by checking the previous message (e.g., ISR) received by the video decoder 230, which may be stored in the computer readable medium 520.

Then, according to the method 550, the processor 510 determines whether the voltage corner corresponding to the required DCVS level is greater than the current rail supply voltage $V_{CX}$ (block 556). If the processor 510 determines that the required voltage corner is greater than the current supply voltage $V_{CX}$, the processor 510 sends a request (vote) to the power controller 220 via the I/O interface 530 and power control bus for the required DCVS level (block 562). For example, at time T3, the video decoder 230 determined that the required voltage corner of V4 is greater than the current supply voltage $V_{CX}$ of V2. Thus, at time T3, the video decoder 230 sent a request (vote) for the required DCVS level.

If, on the other hand, the processor 510 determines that the required voltage corner is not greater than the current supply voltage $V_{CX}$, the processor 510 sends a request to the power controller 220 via the I/O interface 530 and power control bus for the DCVS level associated with the current supply voltage $V_{CX}$ (block 560). After the request has been sent per block 562 or 560, the processor 510 receives a message (e.g., ISR) via the power control bus and I/O interface 530, wherein the message indicates the current supply voltage $V_{CX}$ (block 564). The processor 510 may store the message in the computer readable medium 520 for subsequent access. For example, at time T1, the image rotator 250 determined that the required voltage corner of V2 is not greater than the current supply voltage $V_{CX}$ of V2. Thus, at time T1, the image rotator 250 sent a request for the DCVS level associated with the current supply voltage $V_{CX}$ of V2.

Subsequently, the processor 510 may receive another message (e.g., ISR) regarding the current supply voltage $V_{CX}$ from the power controller 220 via the power control bus and the I/O interface 530 (block 566). This message may be received from the power controller 220 due to a change in the status of the supply voltage $V_{CX}$ due to another subsystem sharing the same voltage rail. For example, when the power controller 220 changed the supply voltage $V_{CX}$ to the voltage corner V4 at time T3, the power controller 220 sent a message (e.g., ISR) at time T4. The message received by the processor 510 per block 566 may be such a message.

In response to this message, the processor 510 proceeds to perform the operation specified in block 552 to determine which DCVS level to request (the required or the current). The processor 510 continues to perform the operations specified in blocks 552 through 566 as discussed above.

Figure 6:
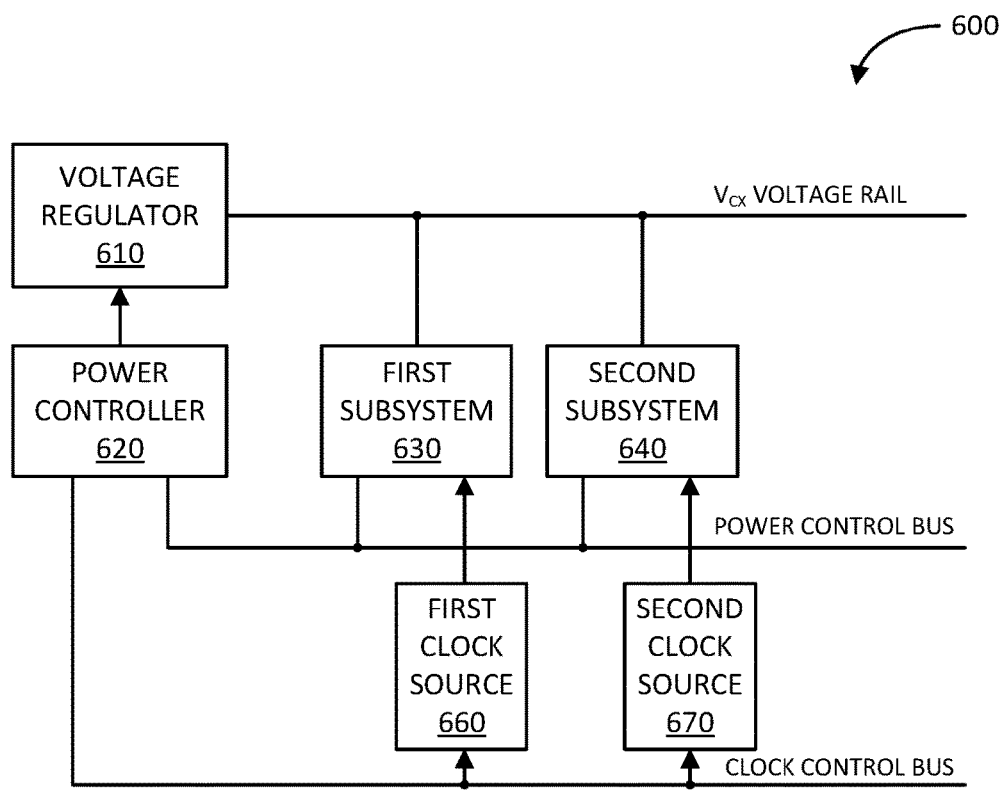
FIG. 6 illustrates a block diagram of another exemplary system in accordance with another aspect of the disclosure.

FIG. 6 illustrates a block diagram of an exemplary system 600 in accordance with another aspect of the disclosure. The system 600 is a more generalized version of the multimedia system 200 previously discussed. That is, the multimedia system 200 includes subsystems, namely the video decoder 230, display processor 240, and the image rotator 250, specific to multimedia applications. In system 600, the subsystems may be configured for any type of application.

In particular, the system 600 includes at least two subsystems, such as a first subsystem 630 and a second subsystem 640. The first and second subsystems 630 and 640 share and receive the same supply voltage $V_{CX}$ from a voltage rail. In other words, the first and second subsystems 630 and 640 are coupled to the $V_{CX}$ voltage rail.

The system 600 further includes a power controller 620 communicatively coupled to the first and second subsystems 630 and 640 via a power control bus. The system 600 further includes a voltage regulator 610 for generating the supply voltage $V_{CX}$ on the voltage rail based on a command received from the power controller 620.

The system 600 also includes a first clock source 660 and a second clock source 670. The first clock source 660 generates a clock signal with a particular frequency for the first subsystem 630 based on a command from the power controller 620. Similarly, the second clock source 670 generates a clock signal with a particular frequency for the second subsystem 640 based on a command from the power controller 220. The power controller 620 sends commands to the first and second clock sources 660 and 670 via a clock control bus.

In operation, the power controller 620 sends messages to the first and second subsystems 630 and 640 in response to a change in the state of the supply voltage $V_{CX}$ on the voltage rail. For example, a particular message may indicate the current level of the supply voltage $V_{CX}$. For a more specific example, the particular message may indicate that the supply voltage $V_{CX}$ is at one of the available voltage corners V1, V2, V3, V4 or V5. Or, the particular message may indicate that the supply voltage $V_{CX}$ is at a voltage corner corresponding to one of the available DCVS levels −1, −2, −3, −4, or −5. Or, the particular message may indicate that the supply voltage $V_{CX}$ has increased or decreased by a specified number of DCVS levels (e.g., +2 may mean the supply voltage has increased from V2 to V4 if the previous supply voltage was V2, or −3 may mean that the supply voltage has decreased from V4 to V1 if the previous supply voltage was at V4). There are other ways of informing the subsystems of the current state of the supply voltage $V_{CX}$.

The current state of the supply voltage $V_{CX}$ may also be a release of a previous request for a DCVS level associated with the supply voltage $V_{CX}$. In this example of FIG. 3, at time T7, the video decoder 230 sent a message to the power controller 220 indicating a release of the granted request for the DCVS-4 level made at time T3.

In response to receiving such messages, the first and second subsystems 630 and 640 may send requests for different DCVS levels to the power controller 620 so that they may operate in a more power efficient manner and/or with improved performance. In response to such requests, the power controller 620 may sends commands to the voltage regulator 610 and the corresponding first and second clock sources 660 and 670 such that the first and second subsystems 630 and 640 are operating under requested DCVS levels.

Figure 7:
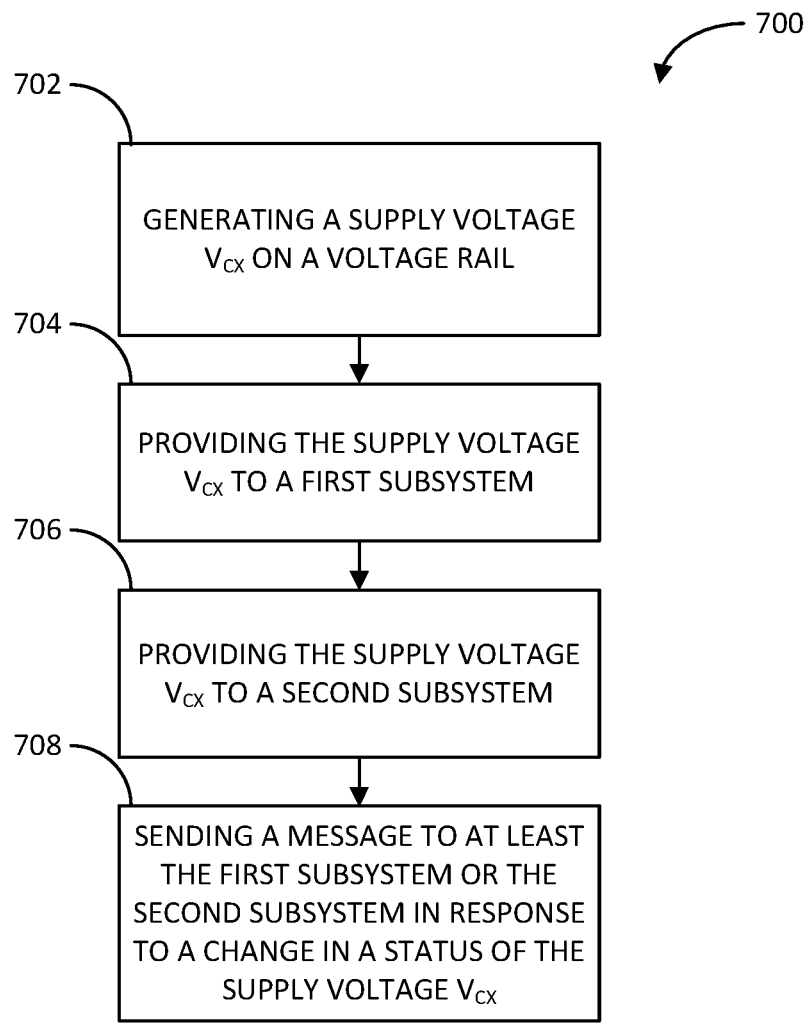
FIG. 7 illustrates a flow diagram of an exemplary method of informing subsystems sharing a voltage rail of the current supply voltage on the voltage rail in accordance with another aspect of the disclosure.

FIG. 7 illustrates a flow diagram of an exemplary method 700 of informing subsystems sharing a voltage rail of the current supply voltage $V_{CX}$ on the voltage rail in accordance with another aspect of the disclosure. The method 700 includes generating a supply voltage $V_{CX}$ on a voltage rail (block 702). Any of the voltage regulators described herein is an example of a means for generating a supply voltage on a voltage rail.

The method 700 further includes providing the supply voltage to a first subsystem (block 704). The coupling of one of the subsystem, such as the video decoder 230 in multimedia system 200 or the first subsystem 630 in system 600, to the $V_{CX}$ voltage rail is an example of a means of providing the supply voltage to a first subsystem.

The method 700 further includes providing the supply voltage to a second subsystem (block 706). The coupling of another one of the subsystems, such as the image rotator 250 in multimedia system 200 or the second subsystem 640 in system 600, to the $V_{CX}$ voltage rail is an example of a means of providing the supply voltage to a second subsystem.

The method 700 further includes sending a message to at least the first subsystem or the second subsystem in response to a change in a status of the supply voltage $V_{CX}$ (block 708). Any of the power controllers described herein is an example of a means for sending a message to at least the first subsystem or the second subsystem in response to a change in a status of the supply voltage.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system, comprising:
   a voltage rail;
   a voltage regulator configured to generate a supply voltage on the voltage rail;
   a first subsystem configured to receive the supply voltage from the voltage rail;
   a second subsystem configured to receive the supply voltage from the voltage rail; and
   a controller configured to send a first message to at least the first subsystem or the second subsystem in response to a change in a status of the supply voltage, wherein the status change includes a release of a request for the supply voltage.

2. The system of claim 1, wherein the controller is configured to send a second message relating to another change in the status of the supply voltage, and wherein the another status change relates to an increase or decrease in the supply voltage.

3. The system of claim 1, wherein the controller is configured to send a second message in response to receiving a request for a particular dynamic clock voltage scaling (DCVS) level from the first subsystem.

4. The system of claim 3, wherein the controller is configured to send a command to the voltage regulator to generate the supply voltage based on the requested DCVS level.

5. The system of claim 3, further comprising a first clock source configured to generate a clock signal for the first subsystem, wherein the controller is configured to send a command to the first clock source to set a frequency of the clock signal based on the requested DCVS level.

6. The system of claim 1, further comprising a first clock source configured to generate a clock signal for the first subsystem, wherein the controller is configured to receive a request to set a frequency of the clock signal from the first subsystem after sending the first message to the at least first subsystem or the second subsystem, wherein the frequency of the clock signal corresponds to a dynamic clock voltage scaling (DCVS) level associated with the supply voltage.

7. The system of claim 1, wherein the controller is further configured to receive a second message from the first subsystem, wherein the second message indicates a request for another supply voltage.

8. The system of claim 7, wherein the controller is configured to send a third message to at least the first subsystem or the second subsystem, wherein the third message indicates the another supply voltage on the voltage rail.

9. The system of claim 1, wherein the controller is configured to receive a request from the second subsystem, wherein the request is for a particular dynamic clock voltage scaling (DCVS) level.

10. The system of claim 9, wherein the controller is configured to:
    send a first command to the voltage regulator to generate a different supply voltage on the voltage rail based on the requested DCVS level; and
    send a second command to a clock source to generate a clock signal for the second subsystem with a frequency based on the requested DCVS level.

11. The system of claim 10, wherein the controller is configured to send a second message to at least the first subsystem or the second subsystem, wherein the second message indicates the requested DCVS level.

12. A method, comprising:
    generating a supply voltage on a voltage rail;
    providing the supply voltage to a first subsystem;
    providing the supply voltage to a second subsystem; and
    sending a message to at least the first subsystem or the second subsystem in response to a change in a status of the supply voltage, wherein the status change includes a release of a request for the supply voltage.

13. The method of claim 12, further comprising sending another message in response to receiving a request for a particular dynamic clock voltage scaling (DCVS) level from the first subsystem.

14. The method of claim 13, further comprising generating another supply voltage on the voltage rail based on the requested DCVS level.

15. The method of claim 13, further comprising:
    generating a clock signal for the first subsystem; and
    setting a frequency of the clock signal based on the requested DCVS level.

16. A system, comprising:
    means for generating a supply voltage on a voltage rail;
    means for providing the supply voltage to a first subsystem;

means for providing the supply voltage to a second subsystem; and means for sending a message to at least the first subsystem or the second subsystem in response to a change in a status of the supply voltage, wherein the status change includes a release of a request for the supply voltage.

17. The system of claim 16, wherein the means for sending the message comprises means for sending another message in response to receiving a request for a particular dynamic clock voltage scaling (DCVS) level from the first subsystem.

18. The system of claim 17, wherein the means for generating the supply voltage comprises means for generating another supply voltage on the voltage rail based on the requested DCVS level.

19. The system of claim 17, further comprising:
means for generating a clock signal for the first subsystem; and
means for setting a frequency of the clock signal based on the requested DCVS level.

* * * * *